(12) United States Patent
Sant et al.

(10) Patent No.: US 9,390,331 B2
(45) Date of Patent: Jul. 12, 2016

(54) SYSTEM AND METHOD FOR ASSESSING RIPARIAN HABITATS

(71) Applicant: Open Range Consulting, Park City, UT (US)

(72) Inventors: Eric D. Sant, Weston, ID (US); Gregg E. Simonds, Park City, UT (US)

(73) Assignee: OPEN RANGE CONSULTING, Park City, UT (US)

( * ) Notice: Subject to any disclaimer, the term of this patent is extended or adjusted under 35 U.S.C. 154(b) by 0 days.

(21) Appl. No.: 14/686,604

(22) Filed: Apr. 14, 2015

(65) Prior Publication Data

US 2015/0294154 A1 Oct. 15, 2015

Related U.S. Application Data

(60) Provisional application No. 61/979,945, filed on Apr. 15, 2014.

(51) Int. Cl.
| | |
|---|---|
| *G06K 9/00* | (2006.01) |
| *G06T 11/00* | (2006.01) |
| *G06F 17/30* | (2006.01) |
| *G06T 17/05* | (2011.01) |
| *E02B 1/00* | (2006.01) |

(52) U.S. Cl.
CPC ........ *G06K 9/00657* (2013.01); *G06K 9/00651* (2013.01); *E02B 1/00* (2013.01); *G06F 17/30241* (2013.01); *G06F 17/30598* (2013.01); *G06T 11/00* (2013.01); *G06T 17/05* (2013.01)

(58) Field of Classification Search
CPC ... G06T 17/05; G06T 11/00; G06F 17/30241; G06F 17/30598
See application file for complete search history.

(56) References Cited

U.S. PATENT DOCUMENTS

| | | | |
|---|---|---|---|
| 2005/0114027 A1 | 5/2005 | Boright et al. | |
| 2006/0294062 A1* | 12/2006 | Folchetti | G06Q 40/025 |
| 2007/0112695 A1* | 5/2007 | Wang | G06K 9/6282 |
| | | | 706/2 |
| 2009/0271719 A1 | 10/2009 | Clare et al. | |
| 2012/0155714 A1 | 6/2012 | Douglass et al. | |
| 2012/0224772 A1 | 9/2012 | Mitchell et al. | |
| 2014/0072209 A1* | 3/2014 | Brumby | G06K 9/6221 |
| | | | 382/160 |

OTHER PUBLICATIONS

Johansen, Kasper, and Stuart Phinn. "Linking riparian vegetation spatial structure in Australian tropical savannas to ecosystem health indicators: semi-variogram analysis of high spatial resolution satellite imagery." Canadian Journal of Remote Sensing 32.3 (2006): 228-243.*

(Continued)

*Primary Examiner* — Stephen R Koziol
*Assistant Examiner* — Jonathan S Lee
(74) *Attorney, Agent, or Firm* — Parsons Behle & Latimer

(57) ABSTRACT

A method of assessing a riparian area includes mapping a physical extent of a potential riparian area (PRA) along a stream using first imagery, determining a percent of basic functional groups of vegetation with the PRA using the first imagery, and determining a Normalized Difference Vegetation Index (NDVI) for the PRA over multiple years using second imagery. The method further includes setting an NDVI threshold value for riparian vegetation in the PRA using the NDVI, mathematically relating the percent of basic functional groups with the NDVI threshold value to evaluate and correct the NDVI threshold value, and determining a proper function and condition (PFC) assessment of the PRA using the corrected NDVI threshold value.

18 Claims, 7 Drawing Sheets

(56) References Cited

OTHER PUBLICATIONS

Lunetta, Ross S., et al. "Land-cover change detection using multi-temporal MODIS NDVI data." Remote sensing of environment 105.2 (2006): 142-154.*

You, Xingzhi, et al. "Remote sensing based detection of crop phenology for agricultural zones in China using a new threshold method." Remote Sensing 5.7 (2013): 3190-3211.*

Xu, Lili, et al. "A Temporal-Spatial Iteration Method to Reconstruct NDVI Time Series Datasets." Remote Sensing 7.7 (2015): 8906-8924.*

White, Michael A., and Ramakrishna R. Nemani. "Real-time monitoring and short-term forecasting of land surface phenology." Remote Sensing of Environment 104.1 (2006): 43-49.*

Wenxia, Gan, et al. "Normalization of NDVI from Different Sensor System using MODIS Products as Reference." IOP Conference Series: Earth and Environmental Science. vol. 17. No. 1. IOP Publishing, 2014.*

Verbesselt, Jan, et al. "Phenological change detection while accounting for abrupt and gradual trends in satellite image time series." Remote Sensing of Environment 114.12 (2010): 2970-2980.*

Amundsen. Mapping Riparian Vegetation in the Lower Colorado River Using Low Resolution Satellite Imagery. Dec. 20, 2010. [retrieved on Jun. 17, 2015]. Retrieved from the Internet: <URL:https://etd.ohiolink.edu/rws_etd/documenUgeUcsu 1292855785/inline> entire document.

Booth et al. Riparian Monitoring Using 2-cm GSD Aerial Photography. Ecological Indicators, vol. 7. 2007. pp. 636-648. [retrieved on Jun. 17, 2015). Retrieved from the Internet: <URL:http://afrsweb.usda.gov/SP2UserFiles/Place/30180000/BoothPDF/35.%20Riparian%20monitoring%20using%202cm%20GSD%20aerial%20photography.pdf>. entire document.

Lymburner. Mapping Riparian Vegetation Functions Using Remote Sensing and Terrain Analysis. Dec. 2005. [retrieved on Jun. 17, 2015). Retrieved from the Internet: <URL:http://people.eng.unimelb.edu.aufjwalker/theses/LeoLymbumer.pdf>. entire document.

Duro et al. Development of a Large Area Biodiversity Monitoring System Driven by Remote Sensing. Progress in Physical Geography. Jun. 2007. (retrieved on Jun. 17, 2015). Retrieved from the Internet: <URL:http://www.researchgate.neUprofile/Michael_Wulder/publication/236455282_Development_of_a_large area_biodiversity _monitoring_ system_ driven_by _remote sensingninks/00b4952cb 761 ba0558000000.pdf>. entire document.

International Searching Authority; International Search Report and Written Opinion for PCT/US2015/025996 dated Jul. 9, 2015.

\* cited by examiner

US 9,390,331 B2

SYSTEM AND METHOD FOR ASSESSING RIPARIAN HABITATS

PRIORITY CLAIM

The present application claims the benefit of U.S. Provisional Patent Application Ser. No. 61/979,945, filed on Apr. 15, 2014 and entitled SYSTEM AND METHOD FOR ASSESSING RIPARIAN HABITATS, the disclosure of which is incorporated herein by reference in its entirety.

FIELD OF THE DISCLOSURE

The present disclosure relates generally to systems and methods for assessing the condition of riparian habitats. More particularly, the present disclosure relates to a simple, repeatable, and accurate monitoring process for determining riparian condition across multiple scales including reaches, pastures, streams allotments or watersheds through time.

BACKGROUND

Although riparian areas occupy only 1-2 percent of arid and semi-arid lands, they are disproportionately important in the provisioning of ecosystem services. Streamside vegetation strongly influences fish populations, water temperature, sediment, chemistry, and water table elevation. For example, riparian areas provide habitat for a variety of animals including big game, song-birds, reptiles, and fish. They also play a beneficial role in storing and cleaning water. Moreover, riparian areas can be indicators of the general condition and stability of contributing watersheds.

Because of the desirable role of riparian areas as an indicator of watershed functionality and as a resource for wildlife and humans alike, there are a number of laws, guidelines, and initiatives that dictate management of riparian areas on federally owned lands of the United States. The United State Department of Agriculture Forest Service (USDA-FS) and The United States Department of Interior Bureau of Land Management (USDI-BLM) both require an assessment of riparian area condition before grazing allotment renewals are made.

Monitoring of riparian areas in relation to these laws and guidelines is often difficult. Riparian areas are linear geographic features that traverse large areas. Traditional localized riparian monitoring that focuses on a single point can adversely affect management policy by focusing management of that location instead of the entire watershed. The scattered nature and limited accessibility of riparian areas can result in high monitoring costs for data with limited extrapolative value. Additionally, high spatial and temporal variation of riparian areas further complicates efforts to adequately evaluate riparian areas relative to management prescriptions (e.g., grazing).

The present application relates to one or more of the above issues.

SUMMARY

It has been recognized that it would be desirable to have a system and method for mapping land cover and estimating productivity of vegetation in riparian areas using remote sensing techniques.

It has also been recognized that it would be desirable to have a system and method for detecting changes and trends in riparian vegetation condition using remote sensing technology.

It has also been recognized that it would be desirable to have a system and method for evaluating current conditions of riparian areas in the context of historical impacts using remote sensing techniques.

In accordance with one embodiment thereof, the present application discloses a method for assessing a riparian area. The method includes mapping a physical extent of a potential riparian area (PRA) along a stream using first imagery, determining a percent of basic functional groups of vegetation with the PRA using the first imagery, and determining a Normalized Difference Vegetation Index (NDVI) for the PRA over multiple years using second imagery. The method further includes setting an NDVI threshold value for riparian vegetation in the PRA using the NDVI, mathematically relating the percent of basic functional groups with the NDVI threshold value to evaluate and correct the NDVI threshold value, and determining a proper function and condition (PFC) assessment of the PRA using the corrected NDVI threshold value.

In accordance with another embodiment thereof, the present application provides a method for assessing a riparian area that includes obtaining first higher resolution imagery of a potential riparian area (PRA) along a stream, mapping a physical extent of the PRA using the first imagery, and mapping a percent of basic functional groups of vegetation within the PRA using the first imagery, the functional groups including riparian and upland vegetation, bare ground, and water/shadow. The method further includes obtaining second lower resolution imagery of the PRA, comprising regular, historical images of the PRA taken in multiple years, determining a Normalized Difference Vegetation Index (NDVI) for each year of the second imagery, setting an NDVI threshold value for riparian vegetation in the PRA using the NDVI, and mathematically relating the percent of basic functional groups with the NDVI threshold value to evaluate and correct the NDVI threshold value. A proper function and condition (PFC) assessment of the PRA is determined using the corrected NDVI threshold value.

Figure 1:
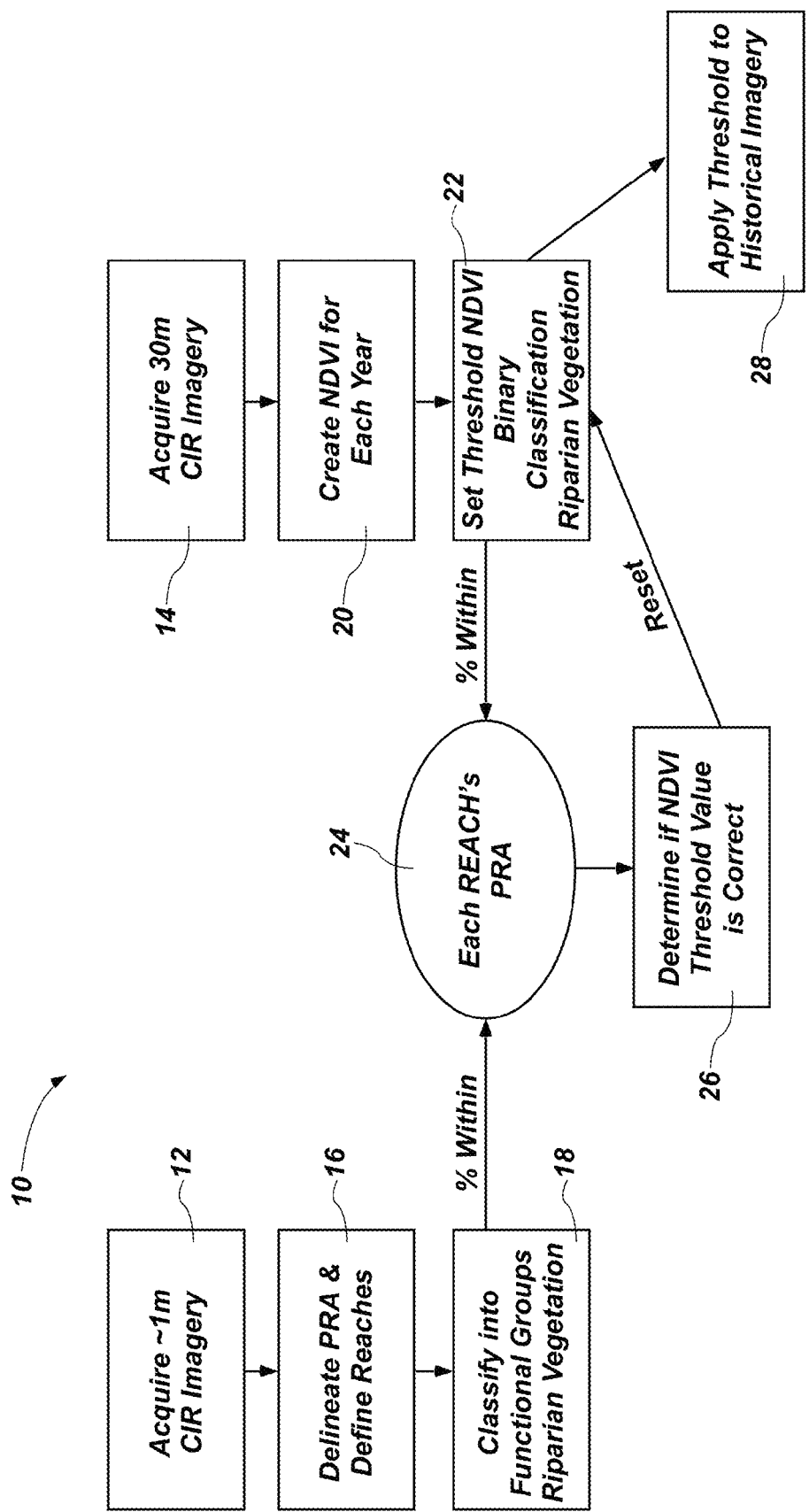
FIG. 1 is a flowchart showing the steps in one embodiment of a method for assessing riparian habitats, in accordance with the present disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the disclosure as defined by the appended claims.

DETAILED DESCRIPTION

As noted above, riparian areas are important in the provisioning of ecosystem services. Streamside vegetation strongly influences fish populations, water temperature, sediment, chemistry, and water table elevation, provides wildlife habitat, plays a role in storing and cleaning water, and can be indicators of the general condition and stability of contributing watersheds. Although current legal and regulatory provisions require an assessment of riparian area condition before grazing allotment renewals are made, monitoring of riparian areas is often difficult.

Advantageously, a system and method has been developed that integrates remotely sensed imagery of differing resolution (e.g. 1 m and 30 m resolution) to map, model, and validate riparian vegetation across a large watershed. Shown in FIG. 1 is a block diagram of an embodiment of a method 10 for assessing riparian habitats, in accordance with the present disclosure. As shown at block 12, the method generally includes acquiring first imagery, such as Color Infra-Red ("CIR") imagery, of a potential riparian area ("PRA") at a first resolution (e.g. 1 m resolution), and acquiring second historical imagery of the PRA at a second lower resolution (e.g. 30 m resolution), as indicated at block 14. The first imagery is used to map and delineate the PRA and define reaches of streams, as indicated at block 16. This essentially involves mapping a physical extent of seasonal flooding near the PRA. Mapping the PRA at block 16 can be done by visually digitizing a training set of polygons that display the evidence of seasonal flooding near a stream, and then interpolating from the polygons a PRA for the entire riparian area. As used herein, the term "seasonal flooding" is intended to include seasonal flooding and/or water table influence upon vegetation. After this process the basic functional groups of riparian and upland vegetation, bare ground, and water/shadow can then be visually classified and then interpolated within and through the PRA.

The imagery that delineates the PRA as determined at step 16 is then classified into functional groups of riparian vegetation, as indicated at block 18. This involves mapping and determining a percent of basic vegetation functional groups within the PRA to determine the extent of riparian vegetation. This process is also mathematically linked to quantitative industry standard on-the-ground measurements (e.g. vegetation cross section surveys).

The second imagery obtained at block 14 is historical imagery (e.g. satellite, aerial photographs, etc.) of the PRA that has been taken regularly and historically over multiple years. As indicated at block 20, the second lower resolution imagery is used to create a Normalized Difference Vegetation Index ("NDVI") for each year of imagery, and this NDVI is used to set a threshold NDVI binary classification for riparian vegetation in the PRA, as indicated at block 22. This step allows the percentage of riparian vegetation to be related to a proper function and condition ("PFC") assessment for the PRA.

As shown at block 24, the proportion (e.g. %) of functional groups of riparian vegetation within each reach, as determined at block 18, is mathematically related to the proportion (e.g. %) of area of each reach within the threshold NDVI binary classification, as determined at block 22, in order to monitor the basic functional groups both temporally and spatially. In this process, a relationship can be developed between the remotely sensed quantification of riparian vegetation with the PFC, which is a standard qualitative method of assessing riparian conditions. Further, in the process of classifying the percent of functional groups, a standard quantitative relationship can be developed between the remotely sensed quantification of riparian vegetation (using the low resolution satellite imagery) with a ground-based quantitative vegetation cross section survey.

As shown at step 26, the result of the mathematically combined data from step 24 is then reviewed to consider whether the NDVI threshold value, determined at step 22, was correct. If not, steps 22-26 are repeated, to reset the threshold NDVI binary classification at step 22, to recombine and link the data at step 24, and to again review the NDVI threshold value at step 26. These three steps can be repeated in an iterative fashion as many times as needed until agreement is reached.

Once the NDVI threshold value has been confirmed between steps 22 and 26, this threshold is then applied to the second, lower resolution historical imagery (indicated at step 14) of the PRA at step 28. The application of this threshold allows a user of the system to accurately and quickly map the land cover and estimate the productivity of vegetation in the riparian area, and to detect changes and trends in condition of the riparian vegetation. Additional details regarding the procedures associated with each of the steps shown in FIG. 1 are provided and discussed below, particular with respect to the Upper Rock Creek Watershed Example provided below.

Figure 2:
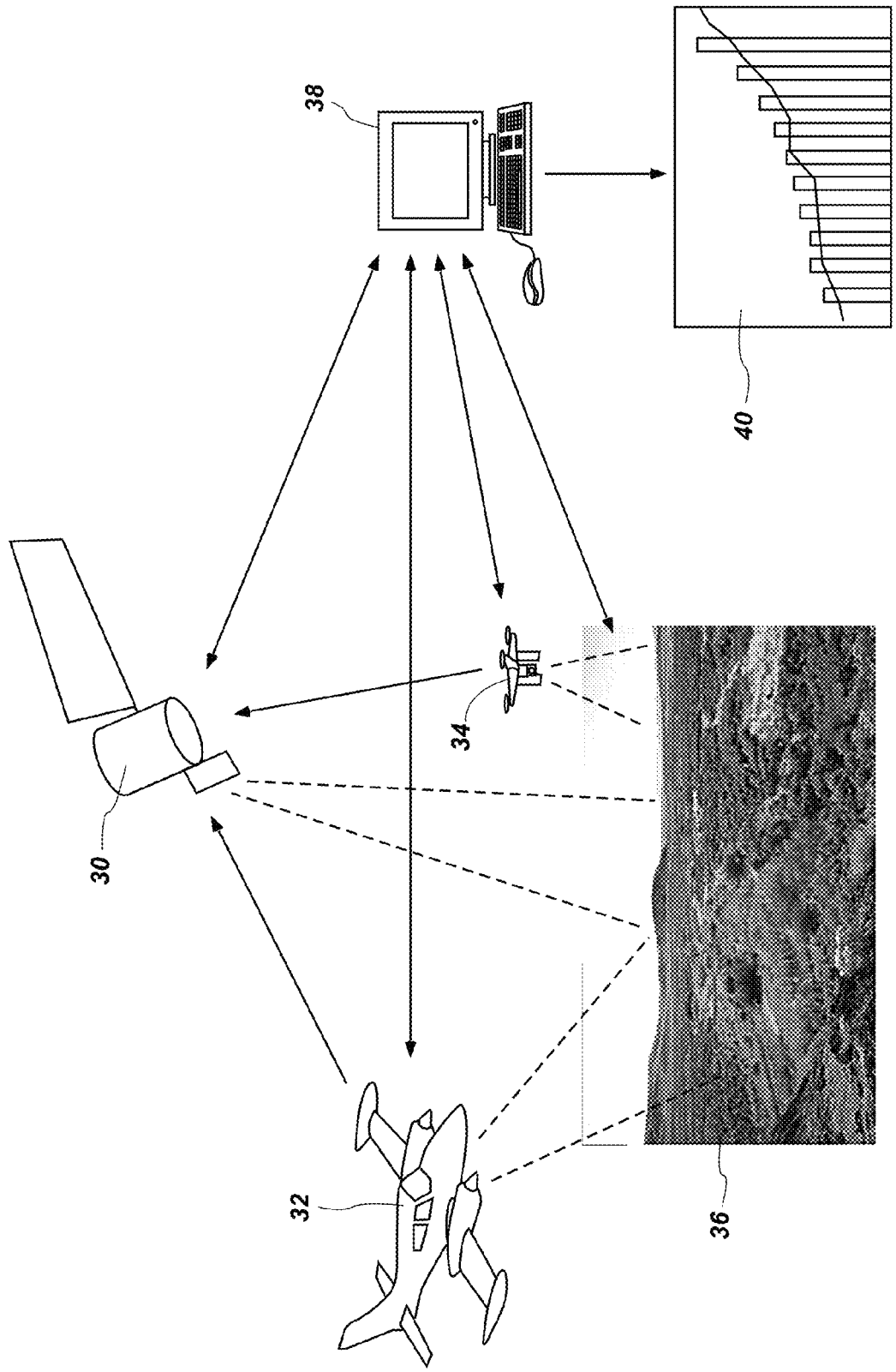
FIG. 2 is a schematic diagram of an embodiment of a system for assessing riparian habitats, in accordance with the present disclosure.

Provided in FIG. 2 is a schematic diagram of an embodiment of a system for performing this method. As shown in FIG. 2, the method for assessing riparian habitats in accordance with the present disclosure can be accomplished by obtaining imagery from one or more of a satellite 30, an aircraft 32, and a drone 34. These devices take aerial or space-based images of the potential riparian area ("PRA") 36. This imagery is relayed to a computer system 38, which receives and analyzes those images, and provides output to a user, such as in the form of graphs, charts, or other metrics, indicated generally at 40.

Remote sensing using air and space-borne electro-optical sensors at various spatial and spectral resolutions has been shown to be effective at mapping land cover and estimating productivity of vegetation. Thus detecting changes in riparian vegetation with the use of remote sensing technology at appropriate spatial, spectral, and temporal resolutions can be a simple, acceptable, and cost-effective means of monitoring riparian conditions and trends. Furthermore, evaluating current conditions in the context of historical impacts using remote sensing could guide future management and provide information on the effectiveness of management actions related to riparian areas. The system and method disclosed herein can thus assist long-term assessment and management of the riparian area. For example, the PFC assessment can be used over an extended period of time (e.g. years and decades) to normalize the effects of climatic variation versus other changes (e.g. livestock, mechanical, fire, etc.) in the riparian area, thus allowing change assessment over time and space.

Using this method, measurements of riparian vegetation that were collected with established quantitative and qualitative field-based methods were correlated to measurements of riparian vegetation made with remotely-sensed imagery collected over the same locations. This demonstrated a simple, repeatable, and accurate monitoring process for determining riparian condition across multiple scales including reaches, pastures, streams allotments or watersheds through time.

Example: Upper Rock Creek Watershed.

Figure 3:
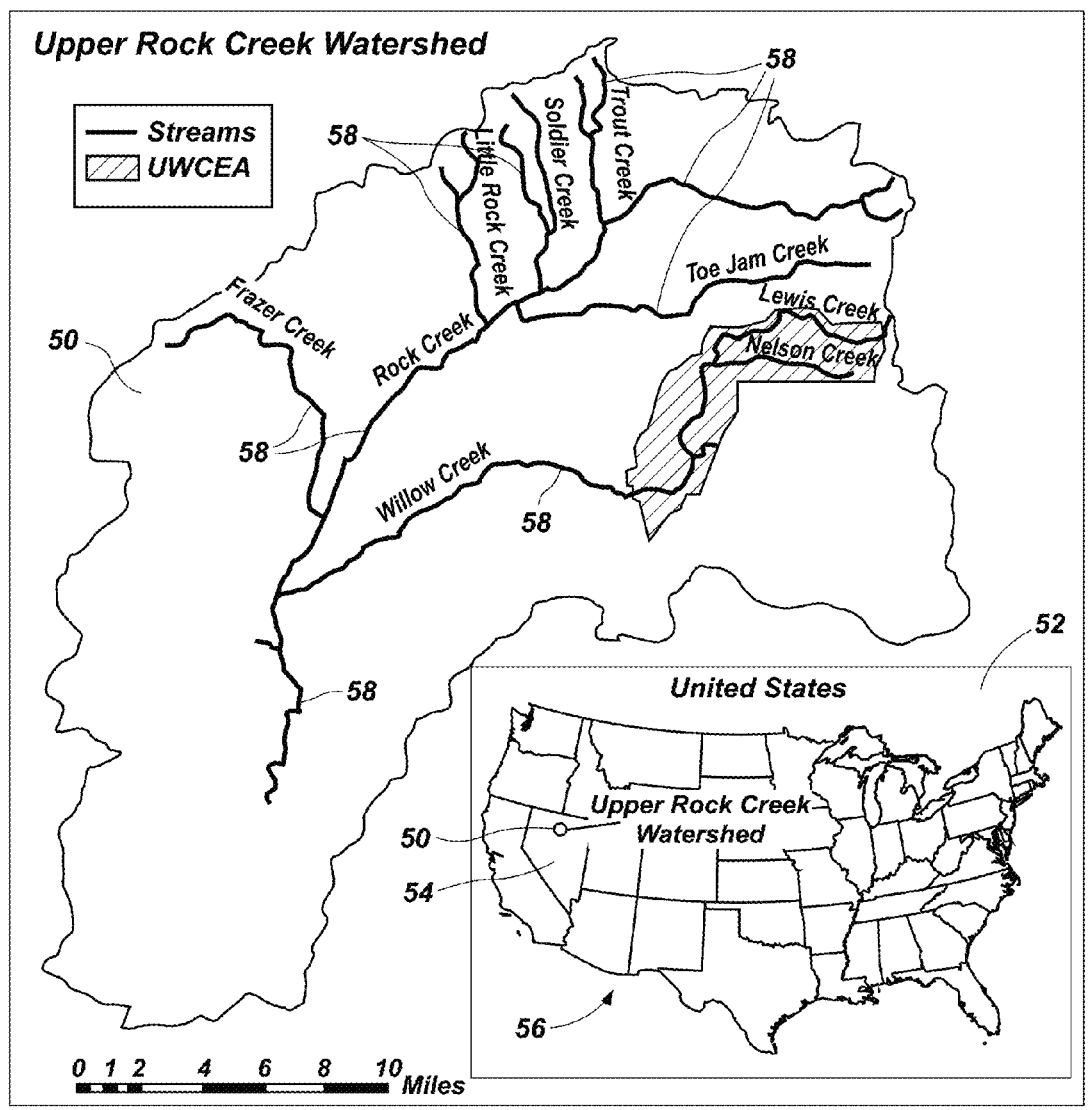
FIG. 3 is a map of a watershed area that was studied during development of the system and method disclosed herein, showing the study area and its location in the United States as a whole.

Viewing FIG. 3, two-hundred thirty-seven km of streams were analyzed within the Upper Rock Creek Watershed study area 50 located in North Central Nevada. Shown in FIG. 3 is a map of the Upper Rock Creek Watershed 50, and a map 52 indicating the location of the study area 50 in relation to the state of Nevada 54 and the United States 56 as a whole. The study area 50 area is bounded north to south by 41.428° N latitude and 40.962° N latitude, and east to west by 116.289° W longitude and 116.863° W longitude.

Shown in FIG. 3 are the streams 58 where riparian condition was assessed using remote sensing and compared to traditional on-the-ground methods for the years 1997-2009. The watershed covers 132,667 ha, has an elevation that ranges between 1,500 m and 2,400 m, and an annual perception range of 250-300 mm. Streams 58 were generally shallow, low volume, and highly variable due to fluctuations in annual precipitation. Riparian areas in good condition were dominated by water-loving species like willows (Salix sp.) and sedges (Carex sp) with very little bare ground and generally perennial water. Riparian areas in poor condition were dominated by upland species such as sagebrush (Artemsia sp.) and drought tolerant grasses with large amounts of bare ground and limited perennial water in the channel.

Riparian conditions in the study area 50 were evaluated over 13 years (1997 to 2009) which included a period when grazing management was changed. Prior to 1997 and up to 2003, the study area was managed with season-long grazing. From 2004 to the 2013, the grazing objectives were changed such that if a pasture was used in the hot season then it would be rested in subsequent years from hot season use for at least one year. Riparian vegetation was not only affected by changes in grazing protocol but it was highly influenced, at least locally, by catastrophic fires (2001, 2005, 2006) and flooding (2005, 2006).

To assess riparian condition and trend, the evaluation focused on riparian vegetation. Riparian vegetation can be generally defined as plants that need above-ambient amounts of water. This general conglomeration of plants was focused upon for multiple reasons. First, riparian vegetation is symptomatic of water storage, while upland vegetation and bare ground occurring in riparian areas indicates a lack of water storage. Too much upland vegetation indicates a poorly functioning riparian area. Increasing riparian vegetation and/or surface water indicates an improving trend in the condition of the riparian area. Second, riparian vegetation shows less inter-annual variation associated with climatic conditions compared to responses of individual upland species. Third, riparian vegetation can be discerned remotely at low cost with coverage across large spatial extent.

To define the spatial context for this study, analysis was limited to the Potential Riparian Area (PRA). The PRA is the area flanking the primary drainage that shows evidence of seasonal flooding. This area is likely to have a water table shallow enough to support riparian vegetation. Beyond the PRA, the lack of moisture can support only upland vegetation species. Water availability distinguishes riparian areas from upland areas and is the single most important factor controlling riparian ecosystems and the associated vegetation structure.

For the Upper Rock Creek Watershed study, the primary remote sensing data sources included National Agricultural Imagery Program (NAIP) 4-band (Blue, Green, Red, and NIR) 1 m data collected during the summer of 2006, and Landsat Thematic Mapper (TM) 30 m imagery acquired for the summers of 1997, 1999, 2001, 2003, 2006, 2008, and 2009. The primary on-the-ground data sources included a quantitative vegetation cross-section survey, qualitative Proper Function and Condition (PFC) assessments, and GPS locations of the PRA. The NAIP imagery was used in delineating PRAs and creating a riparian landcover classification and validated by the on-the-ground assessment of the PRA with GPS. The accuracy of the NAIP riparian landcover classification was validated by the vegetation cross-section survey. Landsat imagery was then used to map riparian vegetation and validated it's accuracy with the NAIP riparian landcover. The proportion of riparian vegetation within a given area modeled with Landsat imagery predicted PFC rating and was validated with the on-the-ground PFC assessments.

The PRA was delineated on the 2006 1 m NAIP Color Infrared (CIR) imagery by visually digitizing a training set on the imagery. The training set generally consisted of polygons that physically displayed the evidence of flooding near a stream. These polygons served as training samples to classify the remaining image pixels using the "Land Cover Feature" and "Manhattan Input Representation" algorithms within the Feature Analyst software. Additionally, the pixels classified as PRA were aggregated by 10,000. This resulted in a single, long, linear PRA feature that omitted small riparian features away from the stream or small non-PRA inclusions within the PRA. The purpose of the remotely delineated PRA was to ensure geographic consistency of measured riparian vegetation within the PRA. This consistency allowed for precise temporal analysis of condition and trend of the riparian area over the streams of the analysis area.

To classify the basic vegetative functional groups of riparian vegetation, upland vegetation, bare ground, and water/shadow for Willow, Nelson, and Lewis Creeks, 1 m NAIP CIR imagery acquired in 2006 was used. The goal of this classification was to provide sufficient detail to capture localized component processes while providing a generalized framework for region wide assessments. Each land cover type was mapped using the Visual Learning Systems Feature Analyst Software 5.0.0.119™ (2010). A minimum of ten samples for each land cover class were digitized as polygons by visually assessing the image and digitizing small areas of the appropriate ground cover type. The average polygon size was 63 m$^2$ with a standard deviation of 63 m$^2$. These polygons served as training samples to classify the remaining image pixels using the "Land Cover Feature" and "Manhattan Input Representation" algorithms within the Feature Analyst software.

In 2006, Cedar Creek Associates (CCA), an environmental monitoring company, established fourteen on-the-ground vegetation cross-section composition surveys along Willow, Nelson, and Lewis Creeks using assessment protocols defined by A. H. Winward. These are the ground-based quantitative vegetation cross section surveys discussed above. These creeks make up the Upper Willow Creek Enhancement Area (UWCEA). The vegetation cross-section composition is designed to quantify the percent of each community type in a particular riparian complex. The method is useful in indicating change and trajectory of riparian condition. At each survey location the CCA crew established five systematically spaced transects where each end was marked with a high precision GPS. A fiberglass tape was then stretched between the two endpoints where the tape was perpendicular to the channel. A unique community type was recorded for the intercept of each 0.5 foot interval. A community type was defined by the two or three most dominant taxa. Samples taken along the length of the transects were summarized to calculate the percent of each unique community type.

Publicly available Landsat Thematic Mapper ("TM") 30 m, 7-band imagery covering the study site was collected on Aug. 30, 2006. The image was downloaded from the United States Department of Interior-United States Geological Survey (USDI-USGS) Earth Explorer website (USDI-USGS, 2006) and segmented to the study area. The TM image was re-projected to the UTM zone 12 NAD83 coordinate system to match all other data layers in this study. The 2006 TM image was converted to percent reflectance, normalized for sun angle, and a Normalized Difference Vegetation Index (NDVI) layer was created. Riparian areas in a neighboring watershed were used to make a visible comparison of riparian vegetation on the NAIP imagery to Landsat NDVI values. This comparison indicated that there were no other vegetation types within the PRA with NDVI values greater than 0.3. Thus, the NDVI image was converted to a binary representation that assigned the value zero to NDVI values less than or equal to 0.3, upland vegetation, and the value 1 to NDVI values of greater than 0.3, riparian vegetation. This resulted in a map of riparian and non-riparian vegetation within established PRAs.

Proper Function and Condition (PFC) is a qualitative approach for assessing landscape condition of riparian wetland areas. The term PFC is used to describe both the assessment process and the-ground condition of a riparian-wetland area. This on-the-ground assessment refers to how well the physical processes of that riparian area are functioning. Using a qualified and interdisciplinary team, a checklist of yes and no questions are asked in the following categories: hydrology, vegetation, and erosion/deposition. Individual stream reaches are then classified into Proper Function and Condition (PFC), Functioning at Risk (FAR), or Non-Functioning (NF) based on the summation of the checklist. A high proportion of yes answers results in a PFC classification and a high proportion of no answers results in a NF classification. The 1991 Riparian-Wetland Initiative for the 1990's established U.S. national goals and objectives for managing riparian-wetland resources on public lands. One of the principal goals of this initiative was to restore and maintain riparian-wetland areas so that 75 percent or more were categorized into the PFC category by 1997. The PFC assessment process has become a ubiquitous tool across U.S. federal land management agencies to assess riparian areas.

The Elko District of the BLM collected or oversaw the collection of PFC assessments that were periodically taken on a number stream reaches within the Upper Rock Creek watershed beginning in 1997. During the 1997 through 2009 period 55 PFC assessments were made on 23 stream reaches. Stream reaches were determined by the BLM and were dependent on factors such as gradient, riparian area width, stream dendritic attributes, and management units. The 2006 assessments were made using high-resolution aerial images.

PFC for the BLM stream reaches was estimated using Landsat TM imagery collected across multiple years using the NDVI binary approach described above to map riparian vegetation. The same image processing techniques were applied to TM imagery collected in 1997, 1999, 2001, 2003, 2008, and 2009 that were applied to the 2006 image described above. Additionally, the multi-temporal Landsat imagery was radiometrically normalized to the 1997 image using a Pseudo Invariant Features (PIF) process. The 1997 image was completely cloud free and fell in the middle of the dates of the entire Landsat data set.

The on-the-ground PFC ratings of each of the 55 assessed reaches were used to determine the class breaks for the Landsat estimated PFC. These class breaks were modeled with classification tree analysis. A combination of tree, a classification tree program in R, and ArcMap 10.1 were used for analysis. R was used to determine the class break model. ArcMap then read the model and predicted the PFC Rating for each reach.

An accuracy assessment of the PRA was conducted with ground surveys. This assessment consisted of 103 GPS points collected along the field-interpreted edge of the PRA for a 2 km portion of Willow Creek. The difference between the on-the-ground PRA and the image interpolated PRA was then determined.

The accuracy of the NAIP and TM products were assessed using several methods and datasets. The NAIP delineated PRA was tested for accuracy using an on-the-ground assessment of the PRA. For the NAIP-based riparian classification, CCA's vegetation cross-section measurements were used. The 2006 Landsat riparian classification accuracy was determined by comparing the TM-derived percent of riparian vegetation within the PRA to the NAIP 2006 derivation. The historic Landsat data's ability to predict PFC was assessed by withholding 20% of the training data and determining how many of the withheld samples were accurately predicted.

Figure 4:
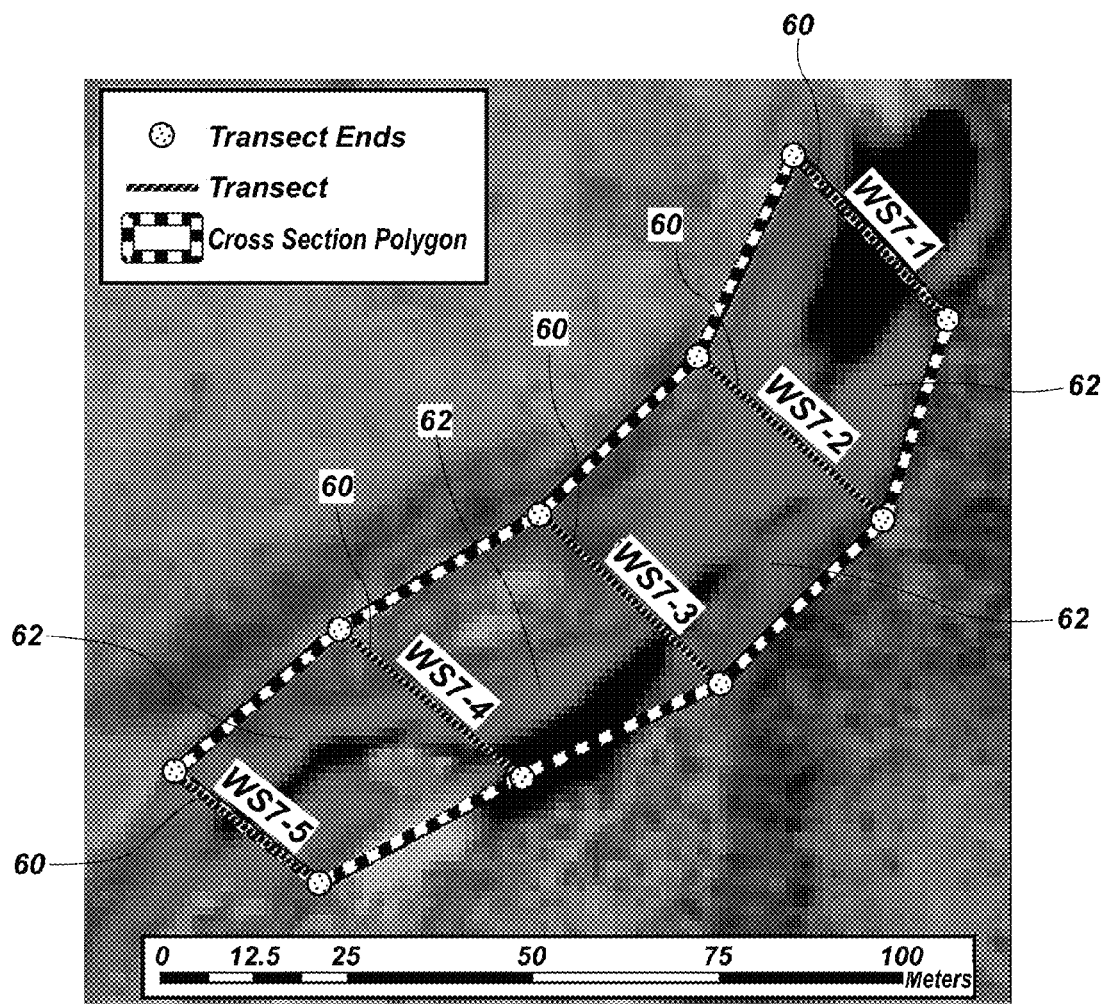
FIG. 4 is a satellite image of one of 14 Cedar Creek Associates CCA monitoring plots used to assess riparian area condition, showing transects and the polygon(s) associated with them.

The NAIP classification of riparian vegetation was assessed using the riparian vegetation proportion of each of the 14 vegetation cross-section riparian surveys made by CCA. The proportion of riparian vegetation for each survey was calculated by first summarizing unique community types into riparian, upland, and water/channel. Second, the riparian vegetation of the five transects of the survey were summed and divided by the entire length of the five transects. This resulted in the proportion of riparian vegetation for the entire survey area. Using the GPS records for the beginning and end of each transect a polygon was created where it was assumed that the proportion of riparian vegetation from all five transects was representative of the polygon. Provided in FIG. 4 is a satellite image of one of 14 Cedar Creek Associates CCA monitoring plots used to assess riparian area condition, showing transects 60 and the polygon(s) 62 associated with them. The percent of riparian vegetation within each polygon 62 was calculated from the NAIP classification within the CCA survey polygon. The percent of riparian vegetation determined by the CCA survey was then linearly regressed to the percent of riparian vegetation determined from the NAIP imagery to develop correlation coefficients or $R^2$ values. This is how the standard quantitative relationship is created between the low resolution imagery and the ground-based quantitative vegetation cross section surveys discussed above. This quantitative relationship is used to classify the basic functional groups of vegetation.

The accuracy of the Landsat riparian classification was determined by comparing results to the NAIP riparian classification. To make the comparison the PRA was segmented into 38 segments on Willow, Nelson, and Lewis Creeks (See FIG. 3) of the UWCEA. Beginning at the lowest point of Willow Creek within the UWCEA, a segment was created by going upstream 1000 meters. This process was repeated going upstream every 1000 meters. Forks in a stream warranted segment breaks if the total stream length was less than 1000 meters. The mean segment length was 976 m with a standard deviation of 100 m. The NAIP generated riparian classification proportion for each segment and the Landsat riparian classification for the same segments were linearly regressed to determine correlation coefficients or $R^2$ values.

To assess accuracy of the Landsat estimated PFC, 80% of the total samples were randomly assigned as training and 20% as validation. This process was repeated five times with five different combinations of training and validation data sets. The purpose of this was to estimate the expected level of fit of the PFC model to the validation dataset. The PFC ratings of the validation data set were compared to the Landsat estimated PFC rating. The results were reported as a mean and standard deviation value for the five iterations. A high mean value and a low standard deviation are indicative of an accurate and repeatable model.

Figure 5:
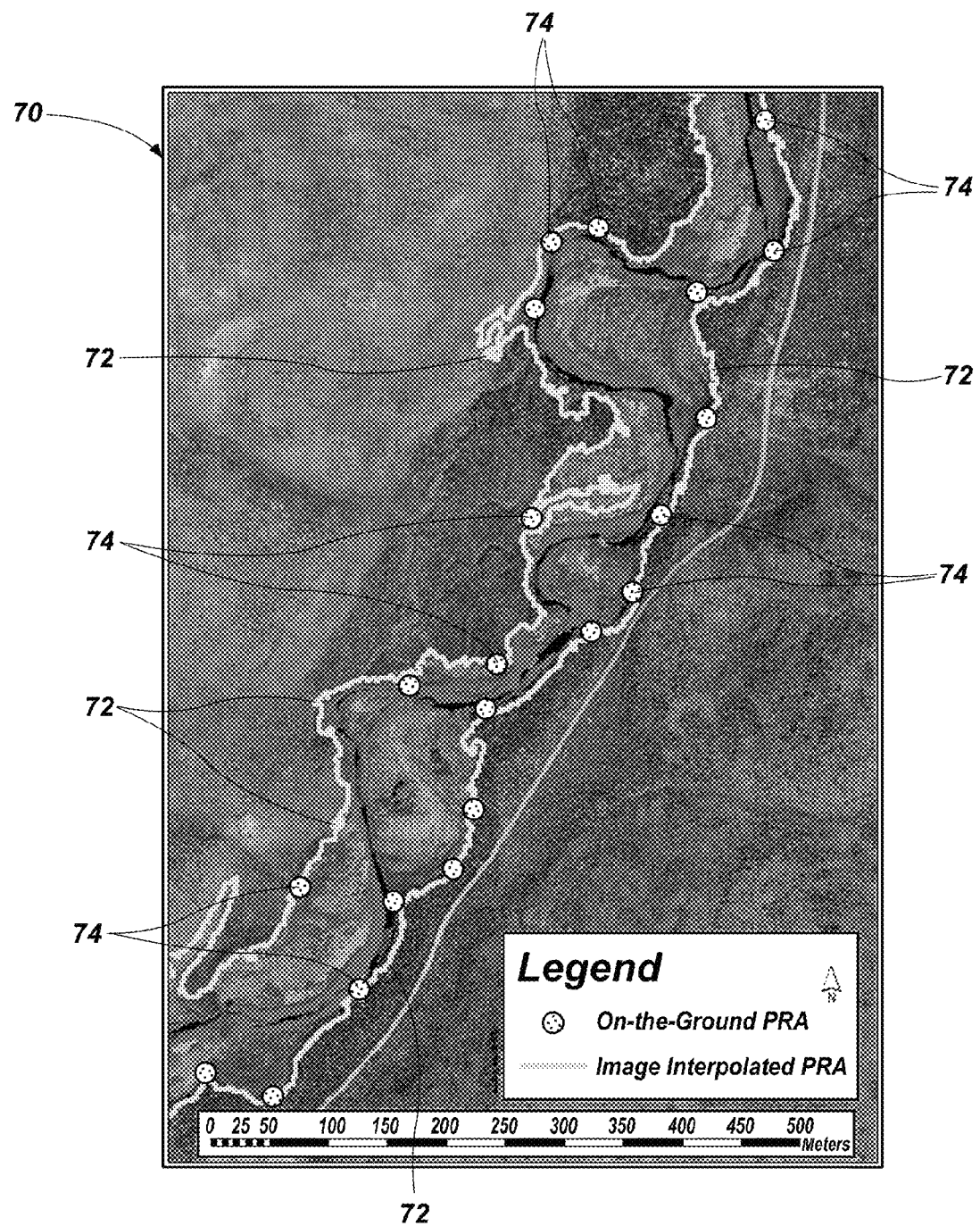
FIG. 5 is a satellite image showing the comparison of NAIP estimated position of the PRA versus an on-the-ground estimate of the PRA.

The average difference between the NAIP delineated PRA and field delineated PRA was 4.2 m with a standard deviation of 2.5 m. The accuracy of the GPS unit used for the on-the-ground assessment was 3 m. Provided in FIG. 5 is a satellite image 70 showing the comparison of NAIP estimated position of the PRA versus an on-the-ground estimate of the PRA. This figure shows the image-derived PRA, indicated by the irregular outline 72, overlain by GPS locations 74 of the ground-derived PRA. The level of agreement between the two PRA techniques was considered good, since the primary purpose of the PRA is to identify the visible extent of the riparian zone adjacent to the stream and thus provide a spatial context to compare results from previous time periods.

Figure 6:
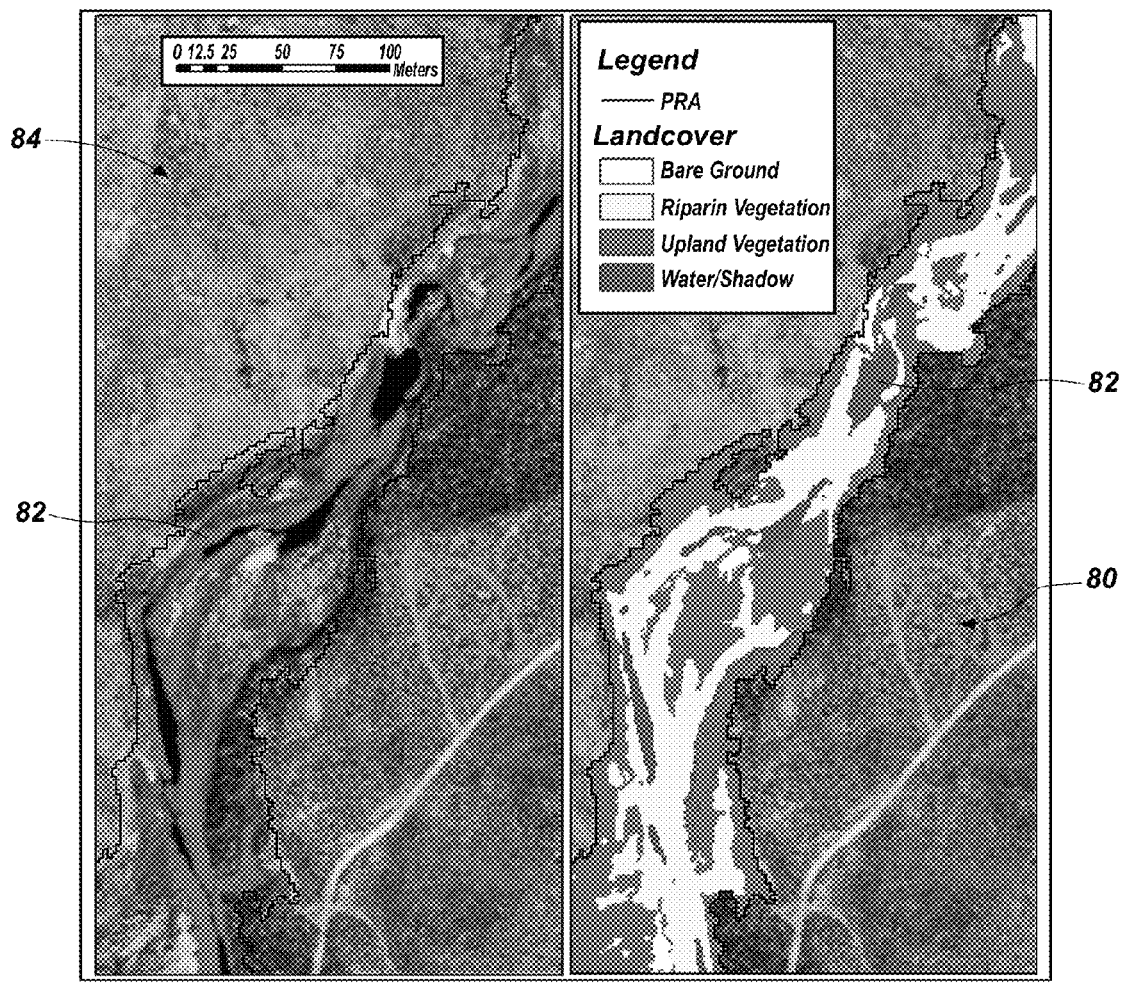
FIG. 6 provides a pair of satellite images showing classification results from the 2006 NAIP CIR imagery (left) and from the 2006 NAIP CIR imagery and the PRA (right).
Figure 7:
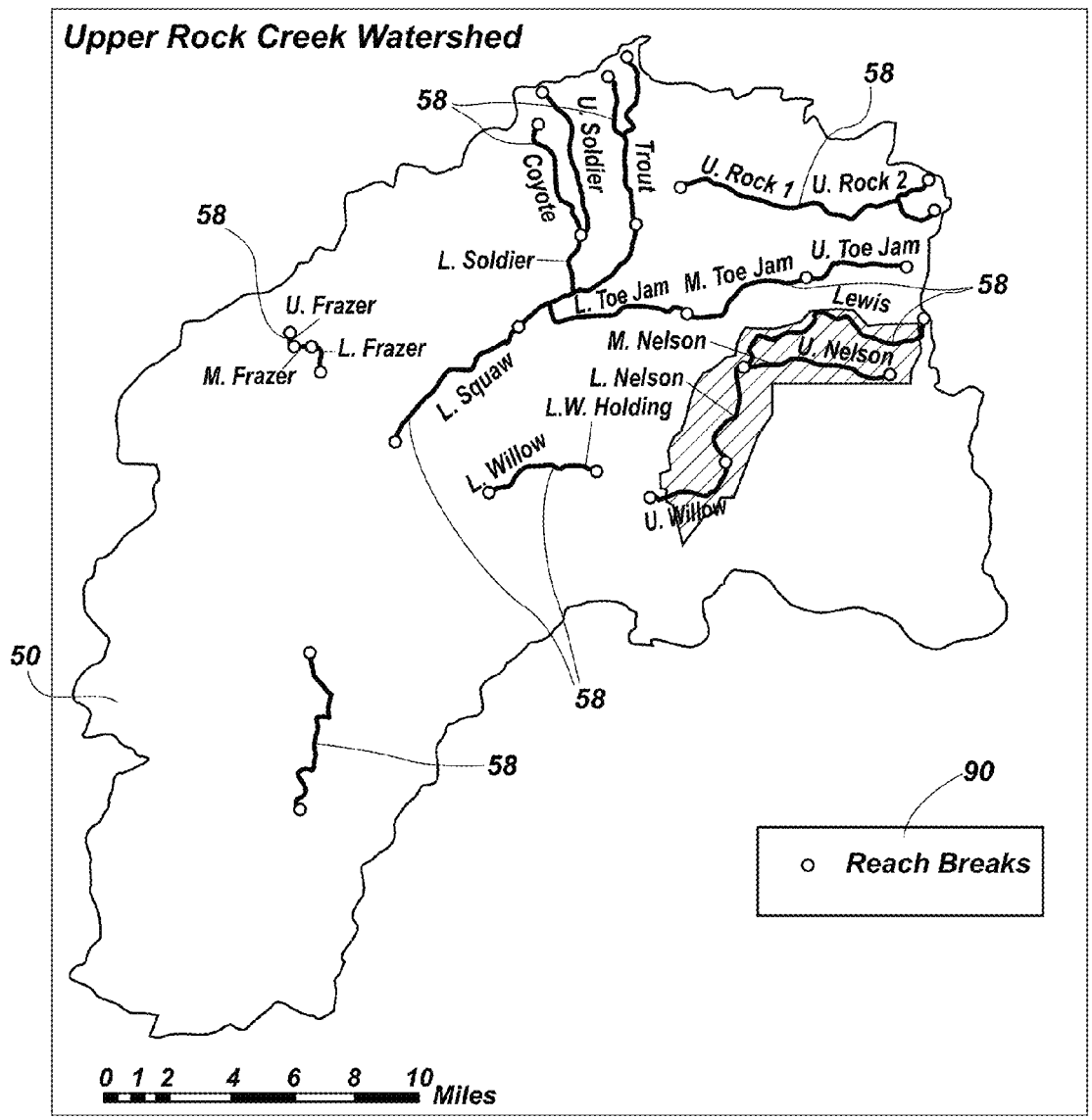
FIG. 7 is a map showing the Landsat-estimated PFC of all of the analyzed stream reaches within the Upper Rock Creek Watershed.

The NAIP imagery riparian classification was highly correlated to CCA's vegetation cross-section measurements with an $R^2$ value of 0.82 and a p-value<0.01. Shown in FIG. 6 are examples of the NAIP riparian classification. These enhanced satellite images show classification results from the 2006 NAIP CIR imagery. The right hand pane shows the 2006 NAIP CIR imagery 80 and the PRA 82. The left hand pane shows the PRA 82 based on classification results from the 2006 NAIP CIR imagery 84. The Landsat predicted riparian vegetation was well correlated to the NAIP prediction with an $R^2$ value of 0.74 and a p value=0.03. The average PFC accuracy was 75% with a standard deviation of 7%. The results by category were NF=62%, FAR=68%, and PFC=86% when assessed across all five iterations. A map showing these Landsat-estimated PFC assessments of all of the analyzed stream reaches 58 within the Upper Rock Creek Watershed 50 is provided in FIG. 7. From this figure, the reaches showing Proper Function and Condition (PFC), Functioning at Risk (FAR), and Non-Functioning (NF) can be seen, as indicated by the legend 90.

NAIP 1 m resolution imagery was used to define the PRA. The accuracy of the estimated PRA ensured geographic consistency of measured riparian vegetation within the PRA. This consistency allowed for precise temporal analysis of condition and trend of the riparian area over the streams of the analysis area. The NAIP 1 m resolution also provided riparian vegetation maps to document the current extent of riparian vegetation across the streams of the entire watershed. Mapping riparian vegetation accurately across large watersheds provides land managers with an unprecedented amount of evaluative power not available with limited point-based samples. Additionally, by validating the NAIP 1 m resolution riparian vegetation to the 14 vegetation cross-section riparian surveys, a strong link was established between an expected quantitative on-the-ground method and this remotely sensed method.

Landsat remotely-sensed data was used to extract relevant riparian vegetation information that can be used to assess riparian condition over a large watershed across multiple years. It provided a framework that offers a current snapshot of riparian conditions that can be compared with past condition. The ability to assess past condition provides important information to guide future management and to evaluate the effectiveness of management actions as they affect riparian condition.

The power of the Landsat 30 m resolution riparian vegetation maps provides not only the ability to extrapolate to larger landscapes, but also takes advantage of the unprecedented 41-year history of the Landsat program. This unique ability to capture riparian condition for a significant time period provides managers with a contextual perspective that is not always (or ever was) available. This multiple spatial and temporal scale assessment can be used to address many pressing issues in range and riparian management. These include the watershed level estimation of riparian vegetation, the temporal variation in riparian condition, and assessing impacts due to upland disturbance and management prescriptions. Furthermore, this type of analysis can provide helpful information relative to current issues such as the evaluation of Lahontan Cutthroat Trout habitat quality as well as habitat evaluation for other species of concern.

USDI-BLM grazing allotment renewal through the NEPA process is dependent on the assessment of the standards of the four fundamentals of rangeland condition. Those four fundamentals are: (1) properly functioning watersheds; (2) water, nutrients, and energy cycles are functioning properly; (3) water quality meets state standards; and (4) habitat for special status species is protected. This process can effectively assess important components of these fundamentals over a large watershed at a 1-meter resolution. Additionally, changes in riparian condition can be detected over the time period of a current grazing permit and determine trend. This type of assessment can help managers determine if the permit holders term and conditions of grazing has maintained riparian condition and also suggest ways to improve grazing in the future. It allows managers to learn, do, evaluate and support adaptive management so that riparian condition can be steadily improved.

This example has demonstrated that NAIP and Landsat remotely-sensed imagery can be used to effectively model riparian vegetation. By assessing riparian areas with this kind of imagery, validated with traditional on-the-ground methods, the costs as well as the spatial and temporal limitations of traditional riparian monitoring methods have been mitigated. Using publically available imagery, it is possible to assess every reach of every stream annually at a fraction of the cost of doing an on-the-ground assessment for a sample of reaches. This overcomes spatial variation that cannot be addressed with point-based sampling by having data for all pixels relating to riparian areas within a watershed. Temporal variation is overcome with yearly assessments of radiometrically calibrated imagery. This temporal ability helps evaluate long-term trends in riparian vegetation cover and also provides better knowledge of the influence of annual weather patterns. This technique, applied across time, has great potential to riparian vegetation change and rangeland health in a contextual perspective that has not been available before. In this way, past management practices can be evaluated for their effectiveness in altering riparian condition and with this hindsight, improved management prescriptions can be developed.

Although various embodiments have been shown and described, the present disclosure is not so limited and will be understood to include all such modifications and variations are would be apparent to one skilled in the art.

What is claimed is:
1. A method of assessing a riparian area, comprising:
  mapping a physical extent of a potential riparian area (PRA) along a stream using first imagery having a first resolution;
  determining a first percent corresponding to basic functional groups of vegetation within the PRA using the first imagery;
  determining a second percent corresponding to basic functional groups of vegetation within the PRA, using sec- ond imagery that is contemporaneous with the first imagery and has a second resolution that is lower than the first resolution;

determining a Normalized Difference Vegetation Index (NDVI) for the PRA using the second imagery;

setting an NDVI threshold value for riparian vegetation in the PRA using the NDVI determined from the second imagery;

converting the NDVI threshold value to a corrected NDVI threshold value using a computer system by:
 a) comparing the first percent with the second percent to approximate a corrected NDVI threshold value; and
 b) repeatedly adjusting the corrected NDVI threshold value until the second percent, modified by the corrected NDVI threshold value, approximately equals the first percent; and determining a proper function and condition (PFC) assessment of the PRA by applying the corrected NDVI threshold value to imagery comparable to the second imagery and corresponding to multiple years.

2. The method of claim 1, wherein mapping the physical extent of the PRA comprises mapping an extent of seasonal flooding near the PRA.

3. The method of claim 2, wherein mapping the extent of seasonal flooding near the PRA comprises visually digitizing a training set of polygons that display evidence of seasonal flooding near the stream, and interpolating from the polygons a PRA for the riparian area.

4. The method of claim 1, further comprising:
visually classifying the basic functional groups using a computer vision system; and
interpolating the basic functional groups within and through the PRA.

5. The method of claim 4, wherein the basic functional groups are selected from the group consisting of riparian and upland vegetation, bare ground, and water or shadow.

6. The method of claim 4, wherein classifying the basic functional groups comprises creating a standard quantitative relationship between the first imagery and a ground-based vegetation survey.

7. The method of claim 1, wherein the first imagery comprises higher resolution imagery, and the second imagery comprises lower resolution imagery.

8. The method of claim 7, wherein the first imagery has a resolution of about 1 m, and the second imagery has a resolution of about 30 m.

9. The method of claim 1 wherein the first imagery comprises Color Infra-Red imagery, and the second imagery comprises satellite imagery of the PRA.

10. The method of claim 9, wherein the satellite imagery of the PRA has been taken regularly and historically, whereby the basic functional groups can be monitored both temporally and spatially.

11. The method of claim 1, wherein the corrected NDVI threshold value establishes a standard qualitative relationship between the first and second imagery and the PFC assessment.

12. A method of assessing a riparian area, comprising:
obtaining first higher resolution imagery of a potential riparian area (PRA) along a stream, the first imagery having a first resolution;
mapping a physical extent of the PRA using the first imagery;
mapping a percent of basic functional groups of vegetation within the PRA using the first imagery, the functional groups including riparian and upland vegetation, bare ground, and water or shadow;
obtaining second lower resolution imagery of the PRA, comprising regular, historical images of the PRA taken in multiple years, the second imagery having a second resolution that is lower than the first resolution;
determining a Normalized Difference Vegetation Index (NDVI) for each year of the second imagery;
setting an NDVI threshold value for riparian vegetation in the PRA using the NDVI determined from the second imagery;
converting the NDVI threshold value to a corrected NDVI threshold value using a computer system by repeatedly and iteratively:
 a) determining a percent of the PRA within the NDVI threshold value; and
 b) comparing the percent of basic functional groups of vegetation within the PRA with the percent of the PRA within the NDVI threshold value to approximate a corrected NDVI threshold value that more accurately correlates with the percent of basic functional groups of vegetation within the PRA;
 c) repeating (a) and (b) by substituting the corrected NDVI threshold value from step (b) for the NDVI threshold value in step (a) until the corrected NDVI threshold value accurately predicts the basic functional groups of vegetation in the PRA; and
determining a proper function and condition using the corrected NDVI threshold value and the second imagery.

13. The method of claim 12, wherein mapping the physical extent of the PRA comprises mapping an extent of seasonal flooding near the PRA by visually digitizing a training set of polygons that display evidence of seasonal flooding near the stream, and interpolating from the polygons a PRA for the riparian area.

14. The method of claim 12, wherein the first imagery comprises Color Infra-Red imagery having a resolution of about 1 m, and the second imagery comprises satellite imagery having a resolution of about 30 m.

15. The method of claim 12, wherein the corrected NDVI threshold value establishes a standard qualitative relationship between the first and second imagery and the PFC assessment.

16. The method of claim 12, wherein the PFC assessment establishes one of a Proper Function and Condition (PFC), Functioning at Risk (FAR), and Non-Functioning (NF) assessment for the riparian area.

17. The method of claim 12, further comprising using the PFC assessment over an extended period of time to normalize measurements of effects of climatic variation versus other effects upon the riparian area.

18. The method of claim 12, wherein mapping the percent of basic functional groups comprises creating a standard quantitative relationship between the first imagery and a ground-based vegetation survey.

* * * * *